United States Patent [19]
Erickson

[11] Patent Number: 6,014,644
[45] Date of Patent: Jan. 11, 2000

[54] CENTRALLY COORDINATED COMMUNICATION SYSTEMS WITH MULTIPLE BROADCAST DATA OBJECTS AND RESPONSE TRACKING

[75] Inventor: Ranel E. Erickson, Henderson, Nev.

[73] Assignee: PP International, Inc., Las Vegas, Nev.

[21] Appl. No.: 08/755,224

[22] Filed: Nov. 22, 1996

[51] Int. Cl.$^7$ ....................................................... G06F 7/00
[52] U.S. Cl. ................................ 705/37; 705/26; 705/27; 709/233
[58] Field of Search .................................. 705/37, 26, 27; 395/200.33, 200.36, 200.47, 200.49, 200.57, 200.61

[56] References Cited

U.S. PATENT DOCUMENTS

| | | | |
|---|---|---|---|
| 3,573,747 | 4/1971 | Adams et al. | 340/154 |
| 4,645,873 | 2/1987 | Chomet | 379/93 |
| 4,674,044 | 6/1987 | Kalmus et al. | 705/37 |
| 4,677,552 | 6/1987 | Sibley, Jr. | 705/37 |
| 4,799,156 | 1/1989 | Shavit et al. | 364/401 |
| 4,992,940 | 2/1991 | Dworkin | 364/401 |
| 5,050,031 | 9/1991 | Weiley | 360/137 |
| 5,230,073 | 7/1993 | Gausmann et al. | 395/600 |
| 5,297,032 | 3/1994 | Trojan et al. | 705/37 |
| 5,319,542 | 6/1994 | King, Jr. et al. | 364/401 |
| 5,325,310 | 6/1994 | Johnson et al. | 364/514 |
| 5,375,055 | 12/1994 | Togher et al. | 705/37 |
| 5,402,336 | 3/1995 | Spiegelhoff et al. | 364/401 |
| 5,440,479 | 8/1995 | Hutton | 364/401 |
| 5,465,206 | 11/1995 | Hill et al. | 364/406 |
| 5,500,793 | 3/1996 | Deming, Jr. et al. | 364/401 |
| 5,528,490 | 6/1996 | Hill | 364/403 |
| 5,552,994 | 9/1996 | Cannon et al. | 364/468.01 |
| 5,727,165 | 3/1998 | Ordish et al. | 705/37 |
| 5,758,328 | 5/1998 | Giovannoli | 705/26 |
| 5,848,396 | 12/1998 | Gerace | 705/10 |
| 5,873,071 | 2/1999 | Ferstenberg et al. | 705/37 |
| 5,915,209 | 6/1999 | Lawrence | 455/31.2 |
| 5,924,083 | 7/1999 | Silverman et al. | 705/37 |

OTHER PUBLICATIONS

Product brochure for Microline, Inc.®; *The Revolutionary Way to Buy, Sell, and Support Multivendor Computer Hardware*, printed in Canada.
Product brochure for Traders Online$^{SM}$ Interactive Image Databases; *Bringing Buyers and Sellers Together*.
Product brochure for ser1ver internet servers, inc.
Product brochure for TRADE'ex Electronic Commerce Systems, Inc.; *Electronic Commerce Solutions for the Internet*.
Product brochure for TRADE'ex Electronic Commerce Systems, Inc.; *Putting the World of Computer Product Right at the Tip of Your Finger*.
Product brochure for TRADE'ex Electronic Commerce Systems, Inc.; *Market Maker*.
Product brochure for TRADE'ex Electronic Commerce Systems, Inc.; *Request for Quotation*.

*Primary Examiner*—Thomas R. Peeso
*Attorney, Agent, or Firm*—Workman, Nydegger & Seeley

[57] ABSTRACT

A system and method for facilitating communication between a plurality of buyers a plurality of suppliers is provided. The communication system provides for coordinated message and response tracking. Buyers and suppliers may submit information to a central database maintained by a service provider. Such information may comprise company profile and product information. Buyers may browse the database and assemble a list of suppliers who will receive a request for a bid. A broadcast message and various response tracking objects are assembled into a single message and response tracking object. The message and response tracking object serves as a central repository for all communications exchanged between the buyers and suppliers regarding the bid. The broadcast message is transferred to the suppliers on the supplier list and the suppliers respond with appropriate information. As responses are received, the information from the responses is assembled into the message and response tracking object. If necessary, reminders may be sent to suppliers that do not respond by a certain date. Information may then be extracted from the message and response tracking object and transferred to an analysis module for comparison and analysis of the responses.

25 Claims, 8 Drawing Sheets

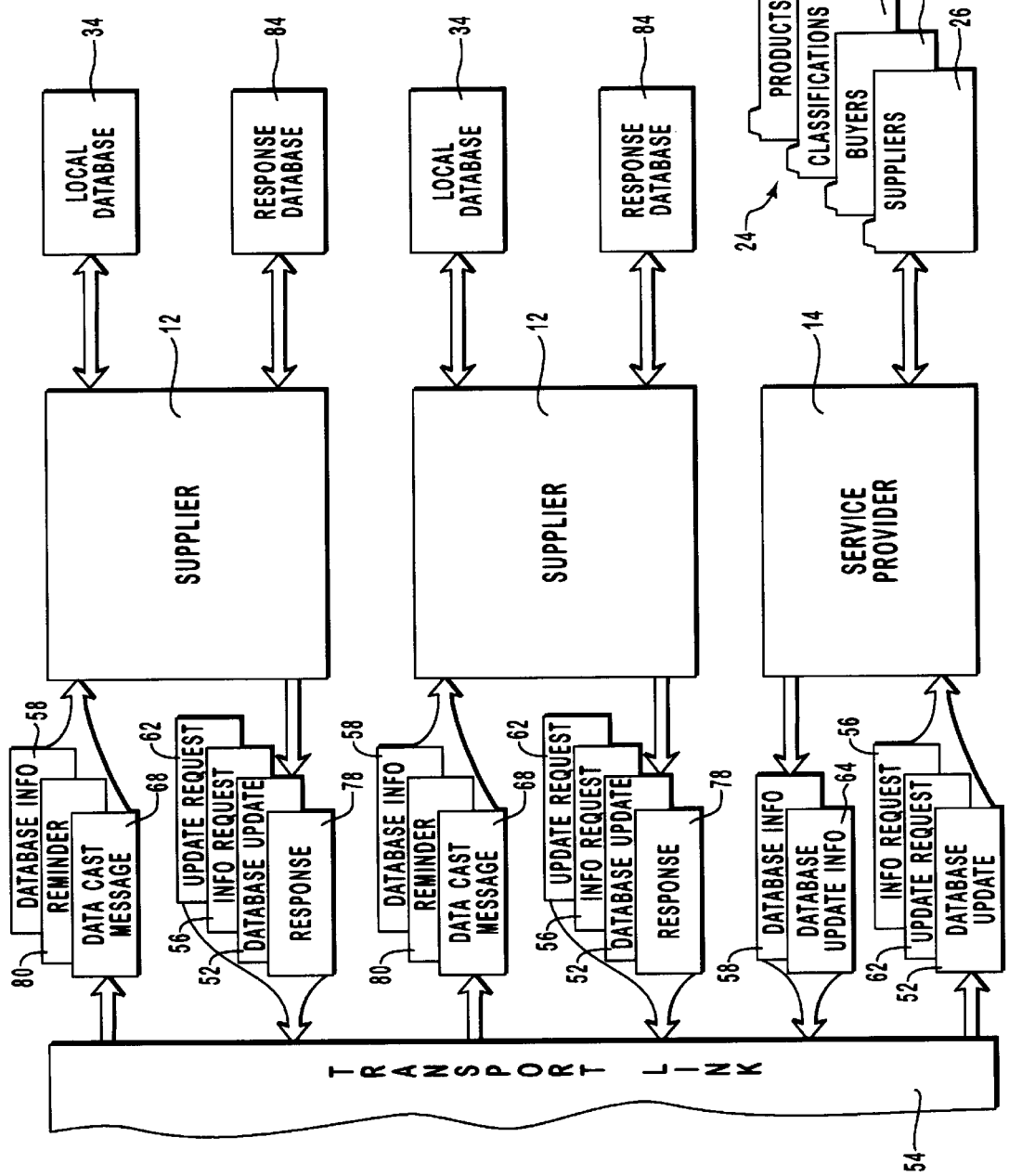

CENTRALLY COORDINATED COMMUNICATION SYSTEMS WITH MULTIPLE BROADCAST DATA OBJECTS AND RESPONSE TRACKING

BACKGROUND OF THE INVENTION

1. The Field of the Invention

The present invention relates to systems and methods for broadcasting a message to a plurality of receivers and for tracking the responses to the broadcast message. More specifically, the present invention relates to systems and methods that can be used by a plurality of buyers to request bids from a plurality of suppliers and track the responses to the request.

2. The Prior State of the Art

The task of large scale purchasers of goods or services has remained relatively unchanged over the years. These buyers attempt to procure appropriate goods or services, balancing the quality of the goods or services with the price of the goods or services. The goal of such buyers has always been to purchase goods or services of an appropriate quality for a minimum cost. Suppliers of goods or services, on the other hand, are often faced with the task of placing information regarding their goods or services into the hands of buyers. Thus, a purchase transaction can, in some sense, be viewed as the culmination of an exchange of information between a supplier or vendor and a purchaser or buyer.

Where a purchaser or buyer procures a number of goods or services, it is not uncommon for the buyer to solicit bids from one or more suppliers. In the bid, the suppliers provide information desired by the buyer. Often times such a bidding process allows a buyer to procure goods or services at a reduced or discounted rate since many suppliers are willing to lower the asking price of their goods or services under such circumstances. Once a buyer has received the bids from various suppliers, the bids may be compared and analyzed and the best "deal" taken.

The above description highlights the various tasks faced by both the buyers and the suppliers in completing a transaction. From the suppliers' point of view, a large part of the problem can be viewed as one of information dissemination. Suppliers desire to have information regarding their company and/or products and services disseminated to as many potential purchasers as possible. To further these goals, companies may spend money on advertising, hire a sales force, attend trade shows, mail information, or otherwise attempt to disseminate appropriate information to potential purchasers. In addition, when a supplier is asked to submit a bid, the supplier must assemble the appropriate information and submit it to a potential purchaser. If the supplier submits bids to many different purchasers, the supplier must maintain records that identify which bids were submitted to which purchasers and track key dates such as the date that a bid must be submitted, the date that a purchaser will make a purchasing decision or award a contract, and so forth.

Purchasers face problems somewhat analogous to those of suppliers. Purchasers wish to collect information from suppliers that offer goods or services of interest to the purchaser. In addition, purchasers may wish to disseminate information regarding the types of goods or services needed by a particular purchaser. Furthermore, purchasers must have the ability to communicate with one or more suppliers in order to solicit bids, receive bids from suppliers, and analyze and compare the information in the various bids. Furthermore, purchasers must also be able to track critical information such as the deadline for submitting bids, the date for making a decision, and so forth. In addition, many purchasers have procurement policies and procedures that must be followed during the procurement of goods or services.

With the vast amount of information that must be exchanged between a purchaser and one or more suppliers, there have been various attempts to automate or facilitate the process using today's communication technology. For example, online catalog systems exist that allow a potential purchaser to browse through an online or electronic catalog, receive information about particular products or services offered, and place orders for those products with a particular supplier. Some suppliers have recognized the value of using electronic mail to communicate with potential customers and have begun to broadcast information to potential purchasers. This practice has given rise to the so called "junk" E-mail received by many. Unfortunately, none of the systems presently in place support all aspects of the procurement process and facilitate both the dissemination of information and the tracking of responses. For example, although it is known to broadcast E-mail messages to a plurality of recipients, no coherent mechanism exists that allows collection of responses from a plurality of individuals. As a result, even if a buyer used electronic mail to broadcast a request for a bid to a plurality of suppliers, there would be no way to track the responses to that request and easily assemble the information from the suppliers so that it can be compared and analyzed. What is needed, therefore, is a system that facilitates the tracking and collection of responses from a plurality of sources so that information relating to a particular bid may be collected from various suppliers and analyzed.

As previously mentioned, the bid process requires that certain dates be tracked and deadlines identified. Present E-mail systems do not allow for the tracking of deadlines. When an E-mail messages arrives at a particular location, a user is free to read or ignore the message as they wish. Furthermore, the only mechanism that exists for identifying desired reply dates is to include such information into the text or body of the E-mail message. It would be desirable to have a system that could remind people of approaching deadlines so that they would not be forgotten.

In summary, there does not presently exist a system that facilitates all aspects of the procurement process by supporting information exchange between suppliers and buyers. Furthermore, systems do not exist that allow a buyer to transmit information to a plurality of suppliers and collect and manage responses from suppliers so that the information contained therein can be analyzed and compared. Finally, systems do not exist that allow tracking of critical dates and deadlines and that facilitate reminding individuals of key dates and deadlines.

SUMMARY AND OBJECTS OF THE INVENTION

The foregoing problems in the prior state of the art have been successfully overcome by the present invention, which is directed to a system and method for coordinating communications and tracking responses. The system and method of the present invention is fully scalable in that the system and method can be adapted to accommodate an unlimited number of suppliers and buyers. Furthermore, the invention allows exchange of information between buyers and suppliers not only during the bidding process but prior to the bidding process as well.

The system and method of the present invention utilize a service provider that maintains a database of information about various buyers, suppliers, products, and services. All these may be grouped by classifications and/or products or product lines. Buyers or suppliers may extract information from the database in order to identify goods or services that are available or desired in the marketplace. Thus, buyers may retrieve information about suppliers and products or services offered for sale. Suppliers, on the other hand, may retrieve information about buyers in order to target advertising or other information to critical accounts. Such information may also allow suppliers to tailor their goods or services in order to better suit the needs of particular purchasers.

The present invention supports a bidding process that may be summarized as follows. A vendor enters information into the database in order to allow potential buyers to identify the various products or services offered by the vendor. The vendor can submit company profiles which describe the company. The vendor may also submit information on products or product lines offered for sale. The company and product lines may be grouped into various classifications in order to help purchasers locate suppliers of a particular type or class of goods or services. The vendors may submit this information to the database through electronic means, such as the internet, or through paper of fax if the vendor has no electronic link to the service provider. Buyers may also submit similar types of information to allow suppliers to identify information about particular buyers and about the goods or services that are needed or required by a particular buyer. The submitted information may be updated as often as a buyer or supplier wish in order to maintain currency.

The service provider collects submitted information and stores it into a database organized to allow rapid access to desired information. Such a database may be stored in a single central location where vendors and buyers may dial in and access the database, or copies of portions of the database may be distributed to buyers and suppliers as desired. Such a distributed database method may be preferred in order to allow rapid access to information by a buyer or supplier without the need to contact a centralized database location. If such a distributed database is used, mechanisms can be put in place in order to update the local databases stored by the suppliers or buyers.

When a buyer wishes to purchase goods or services or request a bid from various suppliers for particular goods or services, the buyer can browse the database using various criteria. For example, the buyer may select suppliers by company name, by key words, by classifications, or any other manner that allows rapid access to desired information. As the buyer browses the database, the buyer can assemble a list of suppliers that will receive a request for a bid.

After the buyer has selected a list of suppliers, the buyer creates and sends a "data cast" message. A data cast message is a message that will be broadcast to the selected suppliers requesting a bid on desired goods or services. A data cast message may contain such information as a text message, dates of importance including the date that the data cast message was sent, the date that a response is due, and the date that one or more reminders will be sent. The data cast message may also contain attached documents such as specifications, scanned pictures, or any other type of electronic or scanned document The data cast message may also contain a series of prompts entered by the buyer. These prompts are used to prompt a supplier for information that should be returned with the bid. For example, prompts can include such information as the total parts cost, the total labor cost, miscellaneous charges, amount of goods supplied, total bid cost, or any other type of information desired by a buyer. These prompts are text strings and there is no limit on the text of prompt. Thus, a buyer is free to request information in categories that he or she desires to compare from various suppliers.

In addition to the data cast message, the buyer also creates a data cast object The data cast object serves as a central unit of information that contains not only the data cast message, but also responses received from various suppliers. Thus, when the data cast object is created, the data cast object has locations set aside to store information from the responses that will be received from the various suppliers. Such an approach differs significantly from the prior art and provides advantages not available in the prior art As responses are received from various suppliers, they can be stored in the data cast object. The data cast object thus can be passed from one individual or organization to another and will contain all information relating to a particular bid. The present invention allows not only broadcast of information but also tracking and storage of responses in a manner that minimizes the likelihood of lost information.

After the buyer creates the data cast message and data cast object, the buyer sends the data cast message to the suppliers previously identified by browsing the database. In a preferred embodiment, all communication between a buyer and the suppliers is performed electronically. Such electronic communication allows automation of responses and automatic storage of responses into the data cast object as explained. However, for those suppliers who do not have access to electronic communications, the data cast message can be sent via facsimile or printed and mailed in an envelope. It should be noted that a buyer is free to update a data cast at anytime. Such an update will necessarily generate an updated data cast message. The updated data cast message can be sent to suppliers as previously described. Such an updated data cast message supersedes and replaces any previous messages.

When vendors receive a data cast message from a buyer, the vendors may store the data cast message in a response database. This allows vendors to track important information and dates received from a plurality of buyers. If a vendor receives a data cast message via E-mail or other electronic communication, when the vendor opens the document, the information contained in the data cast message is displayed to the supplier. The displayed information includes the sequence of prompts previously described. This allows a vendor to submit information desired by a particular supplier. The vendor may also include additional information such as text and/or scanned or electronic documents. After the vendor has assembled his or her bid, the vendor can respond using E-mail. If a vendor does not have access to electronic communications, then fax, printed letters or telephone calls may be substituted. However, such methods are not preferred since it does not allow automated storing of responses.

As responses are received from various suppliers, the buyer gathers the responses and stores information from the responses into the data cast object previously created. As previously explained, by storing the response information into the data cast object, a single contained unit of information is created that allows analysis and comparison of the received responses. An analogy to the data cast object may be a folder or file where all information received regarding a particular bid can be placed. The file can then be carried from one individual or location to another and will contain all information necessary to process and analyze the various responses received. Using a data cast object also opens up a wide variety of options. For example, the buyer may choose to collect information and store it into the data cast object. On the other hand, the buyer may choose to pass the data cast object to the service provider and allow the service provider to collect responses from the suppliers and store them into the data cast object. The service provider can then be responsible for other tasks such as sending out reminders, following up on suppliers that have not responded, and so forth. Once all information has been collected into the data cast object, the service provider can pass the data cast object to the buyer for analysis.

Because all information relating to a particular bid is stored in a single data cast object, it is easy to send follow-up reminders at designated times in order to ensure that deadlines are not missed. For example, the original data cast message created by a buyer may contain dates for one or more reminders to be sent to the suppliers. As these dates approach, the system can automatically send a reminder to those suppliers that have not yet responded to the bid request. As previously described, such reminders may be sent by anyone who has the data cast object.

After all information has been gathered and placed into the data cast object, the buyer can then analyze the information received. For example, information stored in the data cast object may be extracted and sent to an analysis module for comparison. Since a data cast message contains a series of prompts used by suppliers when responding, the information or responses to the series of prompts may be extracted and placed into an spreadsheet program. The various bids may then be compared and analyzed using the spreadsheet program. Other types of analysis modules may also be used or developed in order to analyze the responses received from the various suppliers.

Accordingly, it is a primary object of this invention to provide a system and method for communication coordination and response tracking that facilitates all aspects of the bid process from initial selection of products or suppliers through analysis of responses. Other objects of the present invention include: providing a system and method for communication coordination and response tracking that uses a centralized repository of information to collect responses received; providing a system and method for communication coordination and response tracking that allows a buyer to customize the information requested by entering a sequence of prompts; providing a system and method for coordinated communication and response tracking that allows information received in responses to be placed into an analysis module in order to analyze and compare responses; and providing a system and method for coordinating communication and response tracking that facilitates exchange of information between a plurality of buyers and a plurality of suppliers.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIGS. 3A and 3B are a top level flow diagrams of one embodiment of the present invention;

DETAILED DESCRIPTION OF THE PREFERRED EMBODIMENTS

The following invention is described by using flow diagrams to illustrate either the structure or the processing of certain embodiments that implement the system and method of the present invention. Using the diagrams in this manner to present the invention should not be construed as limiting of its scope. The present invention contemplates both systems and methods for coordinating communication and response tracking. Embodiments of systems of the present invention may comprise a general purpose computer. Such a general purpose computer may have any number of basic configurations. For example, such a general purpose computer may comprise any or all of a central processing unit (CPU), one or more specialized processors, system memory, mass storage such as a magnetic disk, an optical disk, or other storage device, an input means such as a keyboard and/or mouse, a display device, and a printer or other output device. A system implementing the present invention can also comprise a special purpose computer or other hardware system and all should be included within its scope.

Embodiments within the scope of the present invention also include computer readable media having executable instructions. Such computer readable media can be any available media which can be accessed by a general purpose or special purpose computer. By way of example, and not limitation, such computer readable media can comprise RAM, ROM, EEPROM, CD ROM where other optical disk storage, magnetic disk storage or other magnetic storage devices, or any other medium which can be used to store the desired executable instructions and which can be accessed by a general purpose or special purpose computer. Combinations of the above should also be included within the scope of computer readable media. Executable instructions comprises instructions and data which cause a general purpose computer or special purpose computer to perform a certain function or a group of functions.

Figure 1:
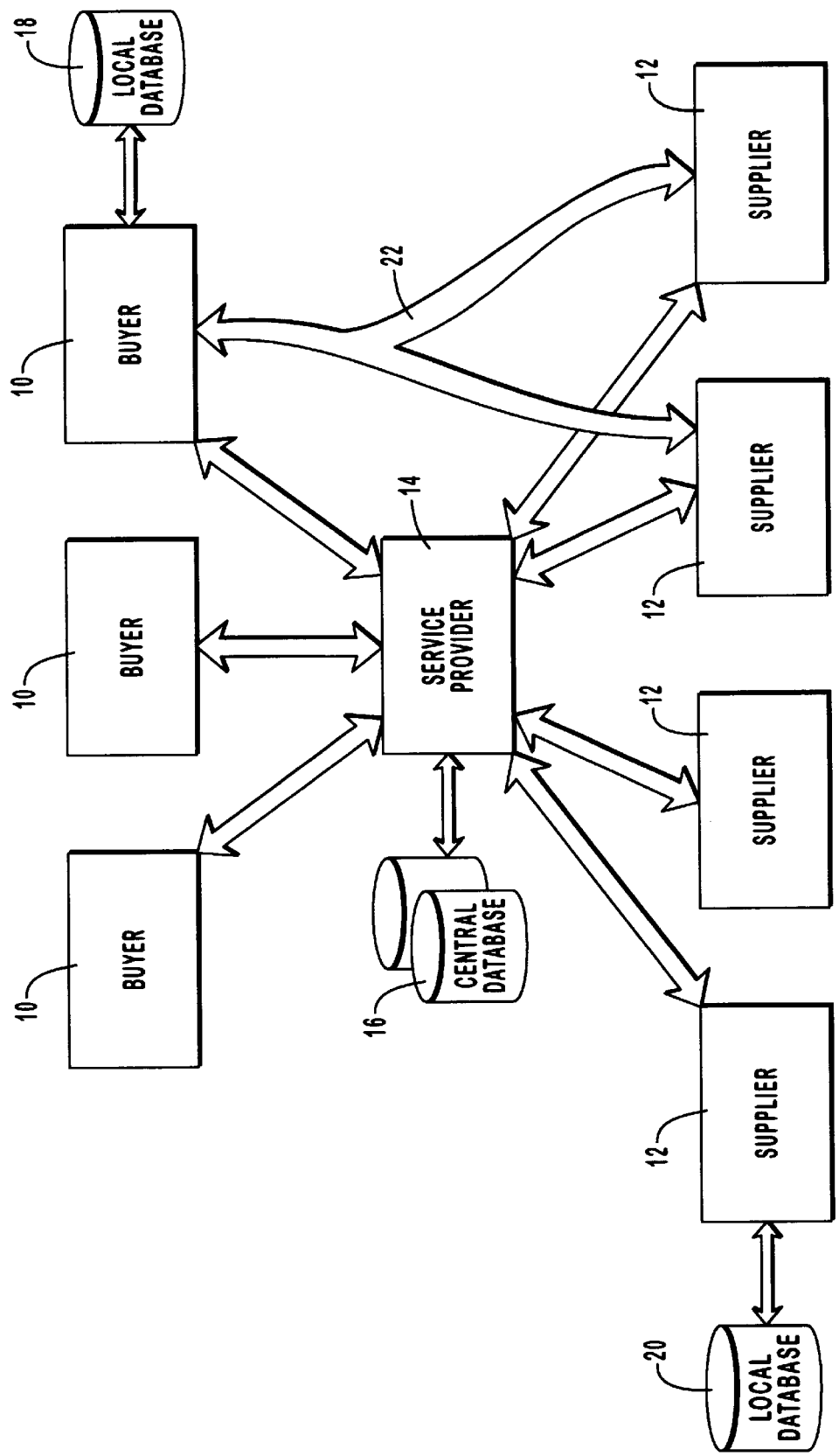
FIG. 1 is a top level diagram of one embodiment of the present invention.

Turning first to FIG. 1, a top level diagram of the invention is presented. The present invention is designed to facilitate communication between a plurality of buyers 10 and a plurality of suppliers 12. The invention supports a bidding process all the way from the initial selection of suppliers to the broadcasting of a request for bid, collection of responses from selected suppliers, and analysis and comparison of the responses received from the suppliers.

Initial information about buyers 10 and suppliers 12 is exchanged via service provider 14. Service provider 14 collects information submitted by buyers 10 and suppliers 12 and stores the collected information into central database 16. As explained in greater detail below, central database 16 may contain information regarding a particular buyer or supplier as well as information regarding products or services needed by a particular buyer or offered by a particular supplier. Information stored in central database 16 may preferably be accessed via key word, classifications, or any other manner that allows easy access by a buyer or supplier to the information stored in central database 16.

The information stored in central database 16 may be accessed through service provider 14 or, alternatively, a portion of the information in central database 16 may be copied by a buyer 10 or supplier 12 into a local database such as local database 18 or local database 20. In some embodiments, it may be preferable to distribute portions of central database 16 to various local databases, such as local database 18 or local database 20. This will allow a buyer or supplier to access desired information locally rather than establishing contact with service provider 14 in order to access central database 16. Such a distributed database model often gives faster access to desired information, but introduces the additional complexity of maintaining current copies of local databases in a variety of locations. However, particular buyers or suppliers may wish to assume a larger share of the maintenance responsibilities for faster access to desired information.

As explained in greater detail below, the present invention facilitates communication between buyers 10 and one or more suppliers 12. Such communication may be achieved through service provider 14 as indicated in FIG. 1, or may be direct from a buyer to one or more suppliers as indicated by arrow 22. These various options are explained in greater detail below but it is important to recognize that the present invention is highly flexible in this area and provides many capabilities not available using prior art technology.

Although the process of soliciting bids and collecting responses using the present is described in greater detail below, the process may be summarized as follows. Supplier 12 submits information to service provider 14 to be included in central database 16. Such information may include, for example, company profile information describing the company. Classification information may also be submitted illustrating the types or classes of services or goods provided by a particular company. Additionally, supplier 12 may also submit information regarding the products, product lines, services, and the like offered by the supplier. Classification information for the products and/or services offered by a particular supplier may also be submitted. In short, supplier 12 may submit any information into central database 16 that would be helpful for a buyer in locating and selecting supplier 12. In certain embodiments, it may be desirable to limit the type of information submitted by a supplier to a predefined set of fields in order to provide consistency and uniformity in central database 16. In other embodiments, perhaps a selected set of information must be submitted with the option of submitting additional information as well. In the present invention, central database 16 serves as a repository for information useful in allowing buyer 10 to locate suppliers 12 that offer goods or services of interest.

In addition to storing information relating to suppliers, central database 16 may also store information relating to buyers. Thus, buyer 10 may also be allowed to submit information to be stored in central database 16. Such information may include, for example, company profiles containing information about the company. Additionally, a company may submit classifications of goods or services that are routinely purchased or desired by a particular buyer. In addition, more detailed information regarding the types of goods or services purchased by a particular buyer may also be submitted. Again, central database 16 may store any information that would be useful in allowing supplier 12 to locate buyers of interest. In some embodiments it may be desirable to allow buyer 10 to submit any type of information. In other embodiments, it may be desirable to require buyer 10 to submit certain information with the option of submitting additional information. In other embodiments, perhaps only a predefined set of information is submitted by a buyer. Including buyer information into central database 16 allows supplier 12 to browse central database 16 in order to identify the goods or services desired in the marketplace. This may allow a supplier to gauge the size of a particular market or may allow a particular supplier to locate and contact buyers wishing to purchase specific goods or services. In addition, such information may allow supplier 12 to tailor goods or services to the particular needs of a segment of the market.

A buyer wishing to purchase goods or services may browse central database 16 or a local database, such as local database 18, in order to identify suppliers that offer goods or services of interest to the buyer. Buyer 10 may assemble a list of suppliers of interest. Buyer 10 may then use this list to distribute information to suppliers, either directly or indirectly through service provider 14. As explained in greater detail below, the present invention allows not only for an initial broadcast message requesting bids for goods or services, but also facilitates sending follow-up reminders in order to help suppliers remember approaching deadlines.

Suppliers receiving a broadcast message requesting bid information will respond with the requested information. Responses are collected from various suppliers and stored together in order to keep all information in a single location. In some embodiments, buyer 10 may directly collect responses and assemble the appropriate information. In other embodiments, such actions may be performed by service provider 14. In these embodiments, after all information has been collected and assembled, the information may then be transferred to buyer 10. Buyer 10 can then examine and analyze the information in order to make purchasing decisions.

Figure 2:
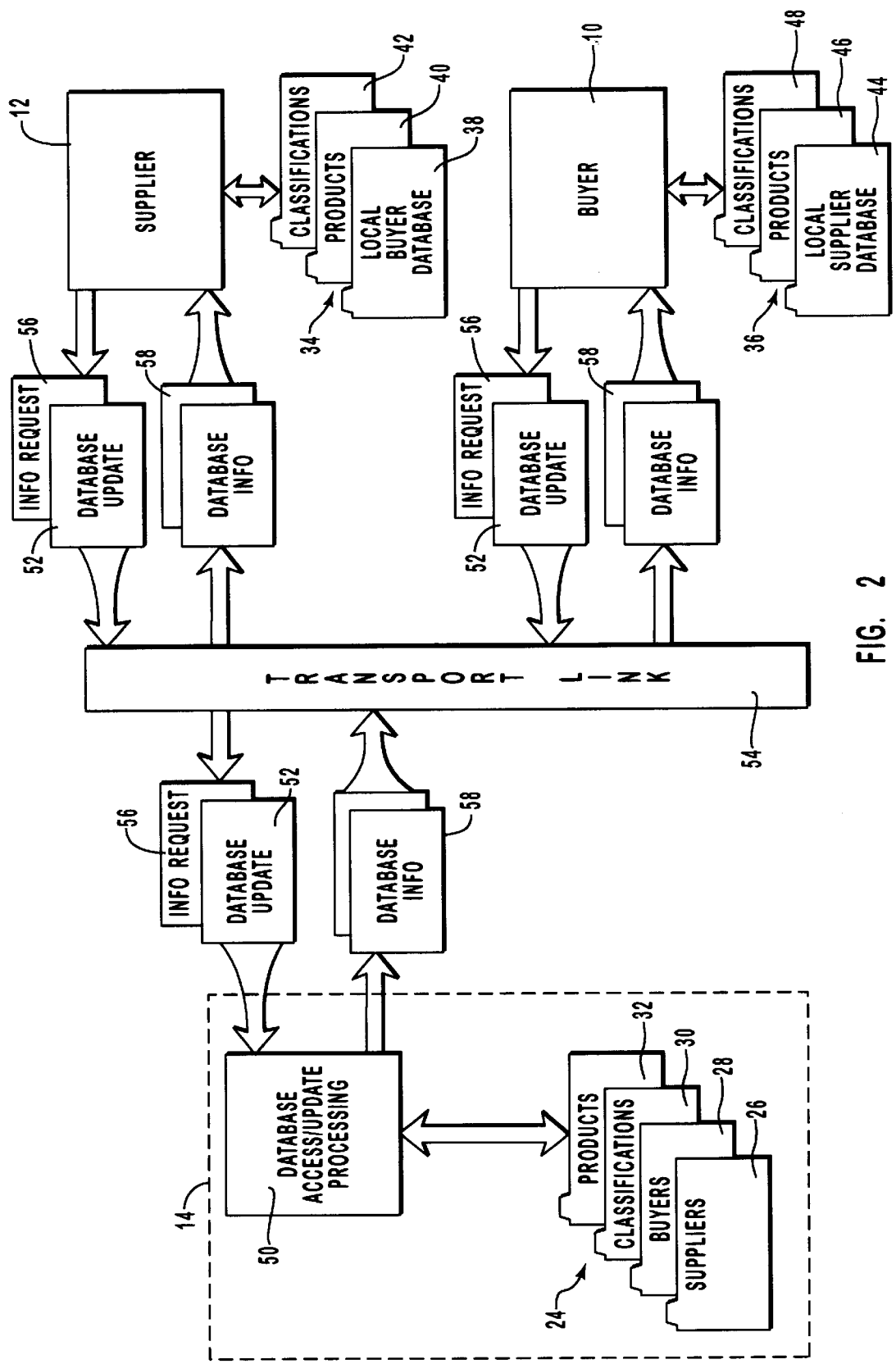
FIG. 2 is a diagram illustrating a distributed database accessed by buyers and suppliers of the present invention.

Turning next to FIG. 2, an embodiment is illustrated showing the database structure of the present invention and the relationship between central database 16 and local databases, such as local database 34 and local database 36. As previously illustrated in FIG. 1, service provider 14 maintains a central database, shown generally in FIG. 2, as 24. Central database 24 can contain a wide variety of information useful to suppliers 12 and buyers 10. As summarized above, and as explained in greater detail below, supplier 12 may use the information stored in central database 24 to locate information about potential buyers of offered services or products. Buyer 10 may use the information in central database 24 in order to locate suppliers of goods or services. Thus, central database 24 may contain information that allow buyer 10 and suppliers 12 to accomplish their objectives. Although in certain embodiments, it is preferred that central database 24 contain information regarding both suppliers and buyers, other embodiments of the present invention may contain only information relating to suppliers or only information relating to buyers.

In order to accomplish the objectives of providing information relevant to buyers and suppliers, central database 24 may contain company profiles of suppliers. This is illustrated in FIG. 2 by suppliers information 26. Company profiles may contain any information necessary or useful for allowing a buyer to find more information about a particular supplier. For example, supplier profiles may contain such information as a supplier ID, the company name, the address of the company, various telephone numbers where the company may be reached, whether the supplier is an "approved" supplier, contact information at the supplier, various text fields containing information such as a brief company profile, notes, and so forth. A wide variety of additional information may be incorporated into a supplier profile. E-mail addresses, internet home pages URL, or any other type of information may be provided in a company profile. It is preferred, however, that as a minimum a supplier profile contain contact information, as well as addresses, telephone numbers, E-mail addresses, and so forth in order to allow a buyer to be able to contact a particular company. Furthermore, it is preferred that a company profile have description information sufficient to allow a buyer to select a supplier from among other suppliers in the database.

Some embodiments also support buyer profiles in central database 24. In FIG. 2, this is illustrated by buyer information 28. Buyer information 28 represents the company profiles submitted by buyers into central database 24. Company profiles for buyers may contain similar information to the company profiles for suppliers. Thus, company profiles for buyers may contain, for example, company name, ID code, address information, telephone numbers, fax numbers, E-mail addresses, internet web page URL, contact information, and so forth.

In order to help locate companies or products, central database 24 may also contain classifications. Such classifications are illustrated in FIG. 2 by classification information 30. Such classifications may comprise, for example, a classification ID, a classification description, and other information necessary to identify a particular classification. Company profiles (either buyer or supplier) and products may then link to these various classifications in order to identify the classes of goods or services offered by a particular company. In the case of products or services offered by a company, linking them to a class will help locate groups or classes of products or services available in the database.

Central database 24 may also comprise product information. This is illustrated in FIG. 2 by product information 32. Such product information may contain a product ID, a supplier ID (in order to identify the supplier that offers this particular product and link the product to the supplier), an item number or ID, a description, price, class information, scanned photographs, audio clips, video clips, and any other type of information necessary to identify a particular product in the database. In one embodiment of the present invention, companies may submit product information for all products or services offered by the company. In other embodiments, it may be desirable to limit the information in product information 32 to information about particular product lines. By requiring or allowing companies to submit information on product lines, the overall amount of information in the database may be reduced without limiting the ability of suppliers or buyers to identify the products or services offered or required.

In some embodiments of the present invention, central database 24 may be the only database in the system and all requests for information may go to the central database. In other embodiments, it may be desirable to distribute some of the information in central database 24 to local databases. In FIG. 2, such local databases are illustrated, for example, by local database 34 and local database 36. Local database 34 represents a local database used by supplier 12 in order to access relevant information. Local database 36 represents a local database accessed by buyer 10 to retrieve relevant information. Referring first to local database 34, local database 34 may comprise relevant buyer profile information. Such information is represented in FIG. 2 by buyer profile information 38. Buyer profile information 38 contains the local buyer information desired by supplier 12. Thus, buyer profile information 38 may represent a subset of buyer profile information 28 of central database 24. In addition to buyer profile information 38, local database 34 may also comprise product information 40 and classification information 42. Like buyer profile information 38, product information 40 and classification block 42 also represent a subset of the information contained in central database 24.

In some embodiments, it would be desirable to allow supplier 12 to select information contained in local database 34. Thus, supplier 12 may be allowed to browse central database 24 and identify those records that should be downloaded to local database 34 for local access. In other embodiments, it may be more desirable to download all buyer information to supplier 12. Such details are considered to be implementations specific and not critical to this invention. All that is required is that local database 34 contain that information necessary or desired by supplier 12.

Local database 36 contains all information needed or desired by buyer 10. Thus, local database 36 may comprise supplier profile information 44, product information 46, and classification information 48. Supplier information 44, product information 46, and classification information 48 may represent a subset of the information contained in central database 24. As previously explained, by keeping a copy of information locally, access to the information may be speeded up.

In order to maintain central database 24, local database 34, and local database 36, a mechanism must be put in place that allows buyer 10 and supplier 12 to submit information to central database 24 and that allows buyer 10 and supplier 12 to receive a subset of the information contained in central database 24. In FIG. 2, this mechanism is illustrated, for example, by database access/update processing block 50. Database access/update processing block 50 represents a process running on service provider 14, that maintains central database 24 and sends information to supplier 12 and buyer 10 for their respective local databases.

Information may be submitted by supplier 12 and buyer 10 to central database 24 through database update messages. In FIG. 2, such messages are illustrated, for example, by database update message 52. Database update message 52 may contain any information that a supplier or buyer wishes to submit to central database 24. Such information may comprise, for example, the company profile information previously described, the classification information previously described, or the product information previously described. The format of database update message 52 is not critical and it does not matter whether a single universal message is used or whether specific messages are used for the various types of information that are submitted to central database 24.

When database access/update processing block 50 receives database update message 52, database access/ update processing block 50 extracts the appropriate information from database update message 52 and places the information into central database 24. Upon submission of new information into central database 24, suppliers or buyers interested in that record may be informed that new information has been added to central database 24. Such a mechanism may be useful, for example, to ensure that a local database has the most current information available in central database 24.

As illustrated in FIG. 2, messages exchanged between buyer 10, supplier 12, and service provider 14 travel across transport link 54. Transport link 54 represents an example of means for transferring information. Transport link 54 is intended to illustrate a generic transport mechanism and not any particular type of transport. It is preferred, however, that transport link 54 be an electronic communication medium. This allows messages exchanged between supplier 12, buyer 10, and service provider 14 to flow electronically without the need to manually enter information into central database 24, local database 34, or local database 36. If, however, a particular supplier or buyer does not have access to an electronic transport medium, then facsimile, telephone, or paper mail may be used to exchange appropriate information. Such a transport mechanism will, however, necessitate the entering of information into the appropriate database by hand. It is anticipated that most, if not all, communication will be electronic due to the widespread availability of electronic communication media including the internet, local area networks, wide area networks, dial-up communications, and other electronic communication means.

In order to update a local database, supplier 12 or buyer 10 may issue an information request. Such an information request is illustrated in FIG. 2 by information request message 56. Information request message 56 may be a request to update a portion or all of the appropriate local database. For example, in the embodiments where a supplier or buyer selects the information that is contained in its local database, information request 56 may identify those records of database 34 that are to be checked for currency. On the other hand, if the embodiment requires that a local database contain all appropriate information from central database 24, then information request 56 be interpreted to transfer all relevant information from local database 24 to the appropriate local database.

In order to identify information that needs to be updated, embodiments within the scope of this invention may comprise means for identifying records that should be updated. Such a means may comprise, for example, a date stamp or other means to recognize the latest version of a database or a portion of a database. Alternatively, records may be compared for currency between database versions. It is, however, preferred that a simple mechanism be used in order to speed the process of maintaining a local database and keeping a local database current with respect to the central database.

When database access/update processing block 50 receives information request 56, database access/update processing block extracts the appropriate information from central database 24 and returns that information to the buyer or supplier that requested it. Such information may be returned, for example, in database information message 58. Database information message 58 may comprise any information from central database 24 that needs to be transferred from service provider 14 to supplier 12 or buyer 10.

Although the description of maintaining a local database presented above has focused on a supplier or buyer requesting update of information from service provider 14, other mechanisms are also possible. For example, service provider 14 may keep track of the records in the various local databases. When new information is submitted that affects a particular record of the database, then the updated record may be automatically sent to the appropriate buyers or suppliers by service provider 14. Such an approach would eliminate the need for information request messages to update local databases. As another alternative, service provider 14 may periodically contact each supplier or buyer that maintains a local database and provide updated information. Other mechanisms are also possible and all that is required for the present invention is that the local database maintained by a particular supplier or buyer be able to be updated as new information is received by service provider 14.

Figure 3A:
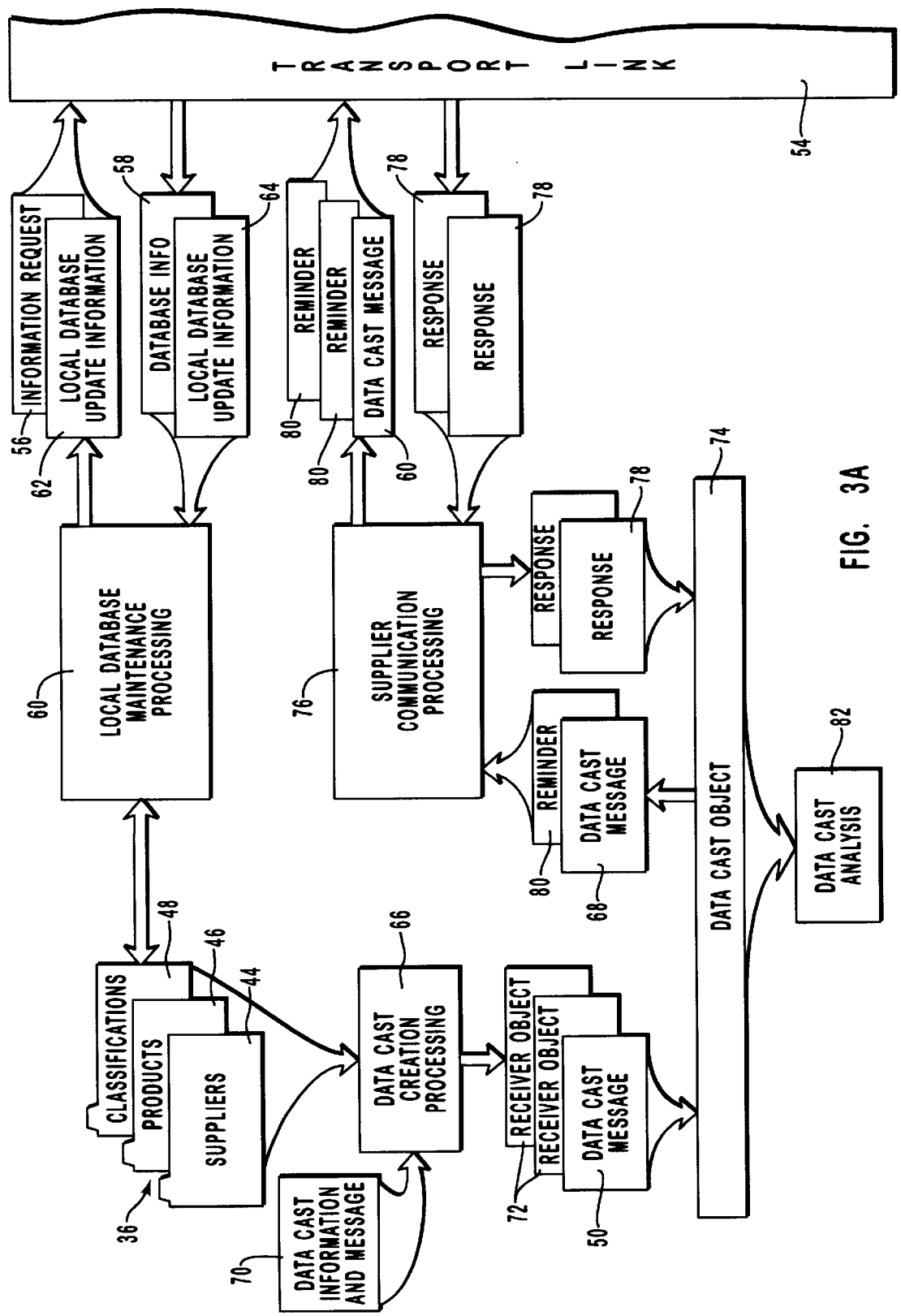

Referring now to FIGS. 3A and 3B, a diagram illustrating one embodiment of the present invention is presented. The process of submitting requests for bids to suppliers and for receiving and tracking responses is presented in conjunction with FIGS. 3A and 3B. In FIG. 3A, the details of the processing that occurs on buyer 10 have been expanded.

Embodiments within the scope of this invention may comprise means for maintaining a local database. As previously explained, both buyers and suppliers may maintain local databases, such as local database 34 or local database 36 of FIG. 2. In FIG. 3A, the means for maintaining a local database is illustrated, for example, by local database maintenance processing block 60. Local database maintenance processing block 60 is responsible for maintaining local database 36. Although the details of local database maintenance processing block 60 are presented below, in essence, local database maintenance processing block 60 is responsible for requesting updates from central database 24 and receiving update information and storing it back into local database 36. In FIGS. 3A and 3B, such a request is illustrated by local database update request message 62. As previously explained in conjunction with FIG. 2, such a function may also be accomplished by using information request message 56. However, in the embodiment illustrated in FIG. 3, information request message 56 is illustrated for the purpose of indicating that specific information may be requested from central database 24. Local database update request message 62, on the other hand, is a general message intended to update all information in local database 36. In other words, information request message 56 may be used in FIG. 3 to request a new record from central database 24. Local database update request 62 may then be used to maintain the requested records in a current state.

Service provider 14 returns requested information in local database update information message 64 or database information message 58. Although embodiments within the scope of this invention will most likely attempt to minimize the number of different messages exchanged between service provider 14 and the suppliers and buyers, separate messages are shown in FIG. 3 simply to illustrate that any number of messages may be defined in order to accomplish the purposes of the invention.

When a buyer wishes to send a bid request message to one or more suppliers and receive information from them, the process starts with the buyer browsing a database containing information about suppliers and products. As previously explained, such a database may be local, such as local database 36, or may be a central database such as central database 24. In the embodiment illustrated in FIG. 3, the buyer would access local database 36. The embodiments within the scope of this invention may therefore comprise means for accessing a database comprising information about suppliers and products offered for sale by the supplier. Any mechanism that allows accessing and browsing of an appropriate database can be used. In FIG. 3A, such means is incorporated into data cast creation processing block 66.

As explained in greater detail below, when a buyer wishes to send a request for bid information to one or more suppliers, a message and response tracking object is created. Embodiments within the scope of this invention may also, therefore, comprise means for creating a message and response tracking object. In FIG. 3A, such means is also illustrated by data cast creation processing block 66. Although the details of data cast creation processing block 66 are presented below, the purpose of data cast creation processing block 66 is to allow a buyer to browse information in local database 36, select a list of suppliers to receive a request for bid, and create a message and response tracking object A key difference between the present invention and the prior art is the use of a message and response tracking object as a central repository for all information regarding a bid and responses received from various suppliers.

The process of creating a message and response tracking object is illustrated in FIG. 3A. The message and response tracking object is an object that comprises the broadcast message that will be sent to one or more suppliers and one response tracking object for each of the suppliers that the broadcast message is sent to. The broadcast message contains the information sent to the suppliers about the bid and each response tracking object is adapted to store information received in response to the broadcast message.

In FIG. 3A, a user creates a data cast message, such as data cast message 68. Data cast message 68 contains all the information that a supplier would need to respond to a particular bid. Such information is drawn, for example, from data cast information and message block 70. Data cast information and message block 70 represents information either retrieved or entered by a user in order to create data cast message 68. Data cast message 68 is the message that will be broadcast to each of the selected suppliers. Thus, data cast message 68 may contain any type of information that a supplier would need in order to respond to a request for bid. Such information may include, but is not limited to, identifiers indicating the sender, the data cast, the user, or any other type of identifiers needed in the data cast message. Data cast message 68 may also comprise date information. Such date information may comprise the date that the data cast message was created or sent, the date or dates that reminders should be sent to suppliers that have not yet responded, the due date of the bids, and any other dates that identify milestones or deadlines that should be met Additional information that may be included in data cast message 68 may include a purchase order number, the subject of the bid, a message that is to be displayed to the supplier containing instructions or other information, the status of the bid, a sequence of prompts that are to be displayed, attached files representing additional information, specifications, scanned documents, etc., and information regarding the analysis module that will be used to analyze the responses. Although not all embodiments may require all these information fields, many data cast messages may contain this type of information.

One unique feature of the present invention is the ability for a user to enter a sequence of prompts that will be displayed to a supplier. The sequence of prompts represent individual data items that should be returned when the supplier submits his or her bid and can represent areas of comparison between competing bids. For example, such a sequence of prompts may comprise a parts subtotal, a labor subtotal, miscellaneous charges associated with the bid, a quantity or amount provided, the total price of the bid, or any other information that should be displayed to the supplier and that should be submitted by the supplier in response to the bid. In one embodiment, the sequence of prompts are text fields that are displayed to the supplier. In such an embodiment, the information requested by the prompt is limited only by the needs and desires of the buyer. Thus, a buyer can request any type of information in the prompts. As explained in greater detail below, the sequence of prompts can represent areas of comparison between bids and may be used by an analysis module for such a purpose.

In addition to data cast message 68, the process of creating a data cast also creates a response tracking object for each of the suppliers that are to receive data cast message 68. In FIG. 3A, such response tracking objects are illustrated by receiver objects 72. Receiver objects 72 allows information received in response to data cast message 68 to be stored into a message and response tracking object. Thus, receiver objects 72 may contain data fields needed to store any appropriate information received from a supplier in response to data cast message 68. For example, receiver objects 72 may comprise ID information necessary to identify the data cast, the response, the sender, the supplier, or any other type of identifying information. Furthermore, receiver objects 72 may contain information about the company submitting the bid. Such information may comprise, for example, a supplier ID, company name, a contact name, address information, telephone number, E-mail, fax, or other information, a comment field, and any other type of information needed to identify the supplier. Additionally, receiver objects 72 may contain fields to store information requested by data cast message 68. Thus, receiver objects 72 may contain locations to store the responses to the various prompts sent in data cast message 68. Finally, if any analysis module is to be used, receiver objects 72 may contain information that allows such an analysis module to extract relevant information and analyze or display such information for analysis by a user. The use of an analysis module in conjunction with the present invention is described in greater detail below.

After a user has browsed local database 36, selected a list of suppliers that are to receive a request for bid, created a data cast message, and created the appropriate number of receiver objects, the data cast message, and the receiver objects are assembled into a message and response tracking object. In FIG. 3A, such a message and response tracking object is represented by data cast object 74. Data cast object 74 serves as a central repository for all information regarding a particular data cast. For example, data cast object 74 comprises data cast message 68 and receiver objects 72, one for each supplier that will receive data cast message 68. A good analogy of data cast object 74 is a folder or file that contains all information relating to a particular bid. Thus, as information is sent and received that relates to a particular bid, such information may be placed into data cast object 74.

After a user has assembled a data cast object, such a data cast object may be used to send and receive information to and from the identified suppliers. Embodiments within the scope of this invention, therefore, comprise means for sending broadcast information to identified suppliers. In FIG. 3A, such means is illustrated, for example, by supplier communication processing block 76. Although the details of supplier communication processing block 76 are presented below, the main function of supplier communication processing block 76 is to handle all communication between a buyer and the suppliers that receive and respond to a particular data cast. Thus, supplier communication processing block 76 extracts data cast message 68 from data cast object 74 and broadcasts data cast message 68 to the identified suppliers. As responses are received from the identified suppliers, the response information is stored into data cast object 74 by supplier communication processing block 76. This process is illustrated in FIG. 3 by response 78 being stored into data cast object 74. Supplier communication processing block represents one example of means for storing information from responses into a message and response tracking object.

One of the problems in the prior art is the inability to track important dates. As previously described, data cast message 68, and data cast object 74 may contain critical date information such as the deadline for bids to be received and one or more reminder dates. This makes it extremely easy to generate reminder messages and broadcast them to those suppliers that have not responded to the bid request. In FIG. 3A, supplier communication processing block 76 can monitor the dates in data cast object 74 and, when appropriate, generate reminder message 80 and broadcast reminder message 80 to those suppliers that have not yet responded by the reminder date. Such reminder messages may contain any appropriate information needed to remind a supplier of the deadlines. Such a reminder message may, therefore, vary anywhere from a simple reminder text message to a complete rebroadcast of data cast message 68.

As previously explained, when a message and response tracking object, such as data cast object 74 of FIG. 3A is used, it makes it extremely convenient to extract information received from various suppliers and to compare and analyze the information in order to arrive at the best purchasing decision. Thus, the present invention facilitates analysis of bid information. The present invention may utilize a separate analysis module to analyze the information received from a supplier. Embodiments within the scope of this invention may thus comprise means for analyzing information received from the suppliers. By way of example, and not limitation, in FIG. 3A such means for analyzing is illustrated by data cast analysis block 82. Data cast analysis block 82 may be any type of analysis module adapted for analyzing or comparing information received from the various suppliers. In one embodiment, data cast analysis module 82 is a spreadsheet program. Information received from the various suppliers may be placed into the spreadsheet program to allow analysis and comparison of the various bids received from the suppliers. For example, data cast message 68 may comprise a plurality of prompts that identify specific information items requested from a supplier. Each supplier should therefore respond with specific items corresponding to each prompt. Each prompt may therefore represent a row in a spreadsheet program and each information item received from each individual vendor may be placed in a column of the spreadsheet. This would allow a rapid comparison of the amounts for each particular information prompt. Using a spreadsheet also allows further analysis on the information received from various suppliers. For example, trade off analysis, or other types of analysis may be performed to make intelligent purchasing decisions.

In order to summarize the bidding process using the embodiment illustrated in FIGS. 3A and 3B, reference is now made to the Table below:

| ACTION | PERFORMED BY |
|---|---|
| Submit Company Classification, and Product Information | Buyer and/or Suppliers |
| Maintain Global Database/Update Local Database | Service Provider/Buyer and/or Supplier |
| Browse Supplier Database and Assemble Supplier List | Buyer |
| Create Data cast Object Using Supplier List and Other Information | Buyer |
| Send Data cast Message to Suppliers | Buyer or Service Provider |
| Send Reminders to Suppliers | Buyer or Service Provider |
| Respond to Data cast Message | Suppliers |
| Collect Supplier Responses | Buyer or Service Provider |
| Analyze Supplier Responses | Buyer |

As indicated in the Table above, the first step is for a company to submit company, classification, and/or product information. This action is performed by buyers and/or suppliers. In FIG. 3B, such information is submitted by suppliers 12 using database update message 52. Service provider 14 receives database update message 52, extracts the appropriate information and stores it into central database 24. The information may be transferred from central database 24 to local database 36 either through information request message 56 or through database update request 62.

As indicated in the Table above, maintenance of the global database is handled by the service provider and update of the local database by transferring information to the local database is handled by a combination of the service provider and the buyer and/or supplier.

The bid process begins when a buyer browses the database and identifies a list of suppliers that should receive a request for bid. The buyer also creates a message and response tracking object such as data cast object 74, using the supplier list and other information such as the data cast message information previously described. The created data cast object comprises the data cast message that will be sent to the suppliers as well as a receiver object for each supplier on the supplier list.

Because the data cast object forms a unit of information that contains both broadcast and response information relating to a bid, the data cast object can serve as a magnet for responses and may be passed from individual to individual. For example, once the data cast object has been created the next step is to send the data cast message to the various suppliers. In the embodiment illustrated in FIGS. 3A and 3B such a process is accomplished by the buyer. In an alternative embodiment, this step may be performed by the service provider. In other words, a buyer may transfer a data cast object to the service provider and the service provider can be responsible for broadcasting messages and receiving responses from the various suppliers.

Once the data cast message has been sent to the suppliers, it may be necessary to send reminders to the suppliers if they do not respond by one or more reminder dates. This step is illustrated in FIGS. 3A and 3B by reminder message 80 sent to suppliers 12 by supplier communication processing block 76. As in the case of the data cast message itself, such a function may also be performed by the service provider if the data cast object is transferred to the service provider and if responsibility for sending reminders is transferred to the service provider along with the data cast object.

As responses are received from the various suppliers, the responses are collected and stored into the data cast object.

As indicated in the Table above, this step may also be performed either by the buyer or the service provider. In the embodiment illustrated in FIGS. 3A and 3B, supplier communication processing block 76 of the buyer performs this step. Alternatively, if a data cast object is transferred to service provider 14, the data cast object may serve as a magnet for the responses. As responses are received by the service provider, the responses may then be stored into the data cast object.

After all appropriate information has been received and stored into the message and response tracking object, such as data cast object 74 of FIG. 3A, then the data cast message and response tracking object may be transferred to an individual, department, or other location for analysis of the bid. When performing an analysis of the responses, an analysis module, such as data cast analysis block 82 of FIG. 3A, may be used to display or analyze the data received. As summarized in the Table above, the analysis of supplier responses is typically performed by the buyer. However, since all information relating to a data cast is contained within a single object, the object may be stored or transferred internally to various departments for analysis.

Returning for a moment to FIGS. 3A and 3B, one final aspect of the embodiment illustrated therein is presented. Focusing for a moment on supplier 12, it is apparent that supplier 12 has a possibility of receiving data cast messages from a plurality of buyers. Thus, it would be desirable to allow supplier 12 to manage all of the data cast information received from various buyers. In order to help achieve this function, supplier 12 may maintain a response database. In FIG. 3B this response database is illustrated by response database 84. When a data cast message is received by supplier 12, the data cast message and any response sent thereto may be stored in response database 84. Furthermore, client software on supplier 12 may allow easy management of the various data cast messages and responses. For example, client software on supplier 12 may automatically remind supplier 12 of approaching deadlines. Because data cast message 68 contains deadline and reminder information, client software on supplier 12 may docket these dates in an internal docket or calendaring system in order to automatically track deadlines as they approach. Furthermore, responses sent in response to data cast message 68 may be stored in response database 84 in order to allow a supplier to track the bids that have been submitted.

Figure 4:
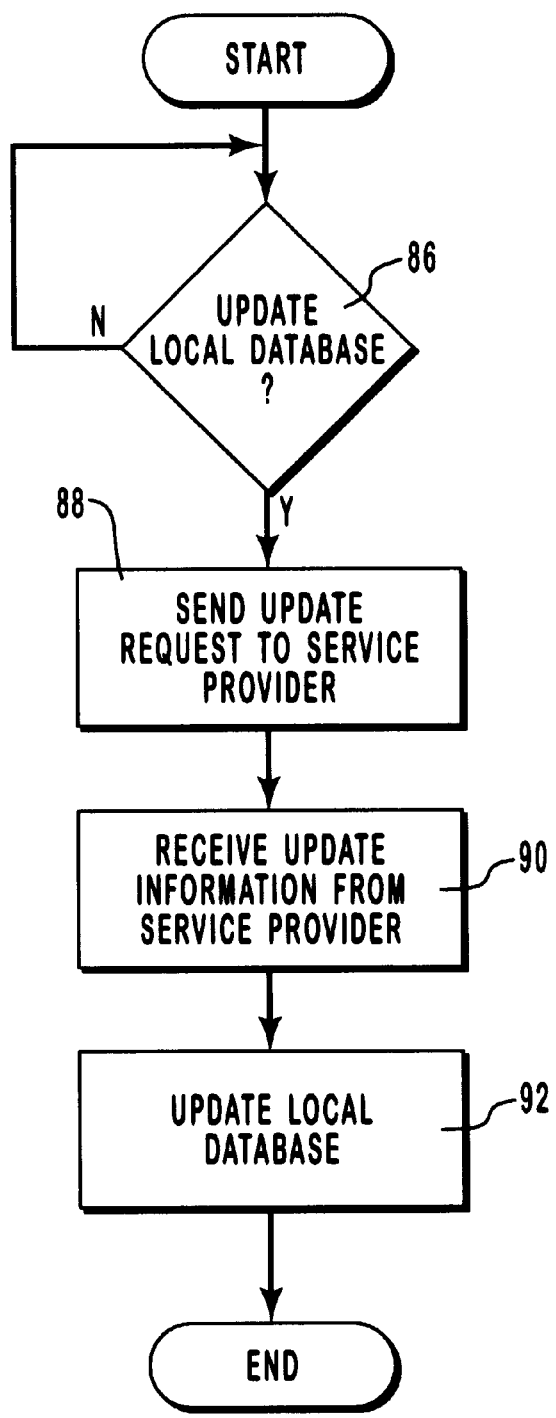
FIG. 4 is a flow diagram illustrating the details of one implementation of the local database maintenance processing block of FIG. 3A.

Turning now to FIG. 4, the details of one implementation of local database maintenance processing block 60 of FIG. 3A are presented. As previously summarized above, local database processing block 60 is responsible for ensuring that local database 36 is properly updated. Thus, FIG. 4 begins with decision block 86 which identifies whether the local database needs to be updated. As described in conjunction with FIG. 2, local database 36 may be updated on a periodic basis so that local database maintenance processing block 60 sends a request to service provider 14 on a periodic or regular schedule in order to receive any new information. As an alternative, such an update may be performed manually. For example, a buyer may wish to manually update the database information before creating an important bid. As yet another alternative, anytime a buyer begins the bid creation process, local database processing block 60 may request an update to ensure that local database 36 is current. Alternatively, updates may be initiated by service provider 14. Such options have been previously described in conjunction with FIG. 2 and any of such options will work in FIGS. 3A and 3B.

If the local database is to be updated, then execution proceeds to step 88 which sends a request to service provider 14. Such a request may be local database update request message 62 or, as described in conjunction with FIG. 2, may be an information request such as information request message 56. All that is necessary, is that service provider 14 be notified via an appropriate mechanism that an update to the local database is being requested. Execution then proceeds to step 90 which receives the updated information from service provider 14. Such update information may arrive in local database update information message 64 or database information message 58 as illustrated in FIGS. 3A and 3B. As information is received from service provider 14, step 92 indicates that the information in local database 36 should be updated. If multiple messages are needed to update the local database, then information may be stored in the local database as each message is received. Alternatively, all messages may be stored and then the local database updated at one time.

Figure 5:
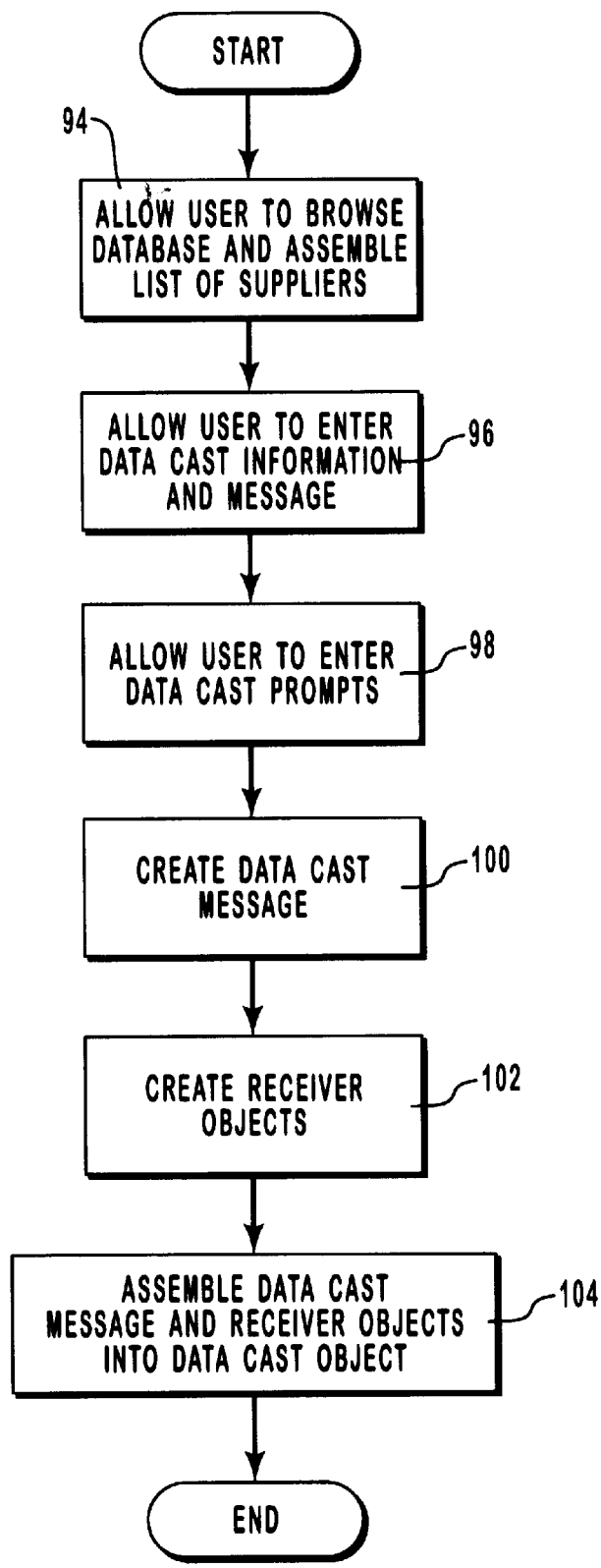
FIG. 5 is a flow diagram of one implementation of the data cast creation processing block of FIG. 3A.

Referring next to FIG. 5, the details of one implementation of data cast creation processing block 66 of FIG. 3A is presented. As previously described, data cast creation processing block 66 may represent means for creating a message and response tracking object and means for accessing a database comprising information about suppliers and products. These functions are more specifically illustrated in FIG. 5.

In FIG. 5, step 94 illustrates that the first function to be performed is to allow a user to browse the local database and to assemble a list of suppliers. This step thus represents one example of means for accessing a database comprising information about suppliers and products. As previously discussed, local database 36 preferably allows easy access to information stored in the database. For example, a user may access various classifications in order to identify all suppliers or products that fall in certain classifications. As another example, it may be desirable to allow key word searches on various data fields in local database 36. In essence, it is desirable to allow a user to browse information contained in local database 36 in an intuitive manner in order to reduce the time it takes to locate suppliers that offer appropriate goods or services. As suppliers are located, the user should be able to add them to a distribution list.

After the list of suppliers has been identified, step 96 indicates that the next action is to allow the user to enter data cast information and a message body. Such a function may be performed for example, by presenting the user with a form or template having various fields that can be filled out in order to create the appropriate information. Any of the fields previously described in conjunction with data cast message 68 of FIGS. 3A and 3B may be presented to a user. Where automatic generation of an appropriate field is available, it may be preferable to present a default value in a field and allow a user to change the default value if desired. In addition, a database of past messages or data cast messages may be kept in order to allow a user to bring up a past message and copy one or more fields into the current data cast message.

Proceeding now to step 98, after basic data cast information and message body have been created, the next step is to allow the user to enter data cast prompts. As previously explained, a data cast message may contain a series of prompts that will be displayed to a supplier and that identify particular pieces of information the buyer requires. If all that is necessary is a final price be submitted, then the user can enter a single prompt for the final amount of the bid. If, however, the buyer wishes greater detail, then the buyer can enter a series of prompts that will be displayed and that identify information that should be returned by the supplier.

The series of prompts provides a convenient point of comparison for the various bids. For example, as previously explained in conjunction with data cast analysis module 82, and as presented in FIG. 7 below, it may be desirable to place each prompt in a row of a spreadsheet program and place the various responses received from various suppliers in columns. Thus, the prompts provide a convenient point of comparison for the various bids and may be use in various ways to analyze and compare the bids.

As indicated in FIG. 5, the next step is to create the data cast message. This is indicated in FIG. 5 by step 100. After a user has entered or retrieved the information required by steps 94, 96, and 98, all information necessary for a data cast message should be available. Thus, data cast message 68 may be created at step 100.

After the data cast message has been created, step 102 indicates that receiver objects are created. As previously described, a response tracking or receiver object is created for each of the suppliers on the supplier list. This ensures that when a response is received from a particular supplier that appropriate space has been allocated and exists to store the information received in the response.

After the receiver objects are created, step 104 then assembles the data cast message and the receiver objects into a single data cast object. As previously explained, such a data cast object represents but one example of a message and response tracking object that forms a contained unit of information that is used throughout the present invention. Step 104 is an example of means for creating a message and response tracking object.

Figure 6:
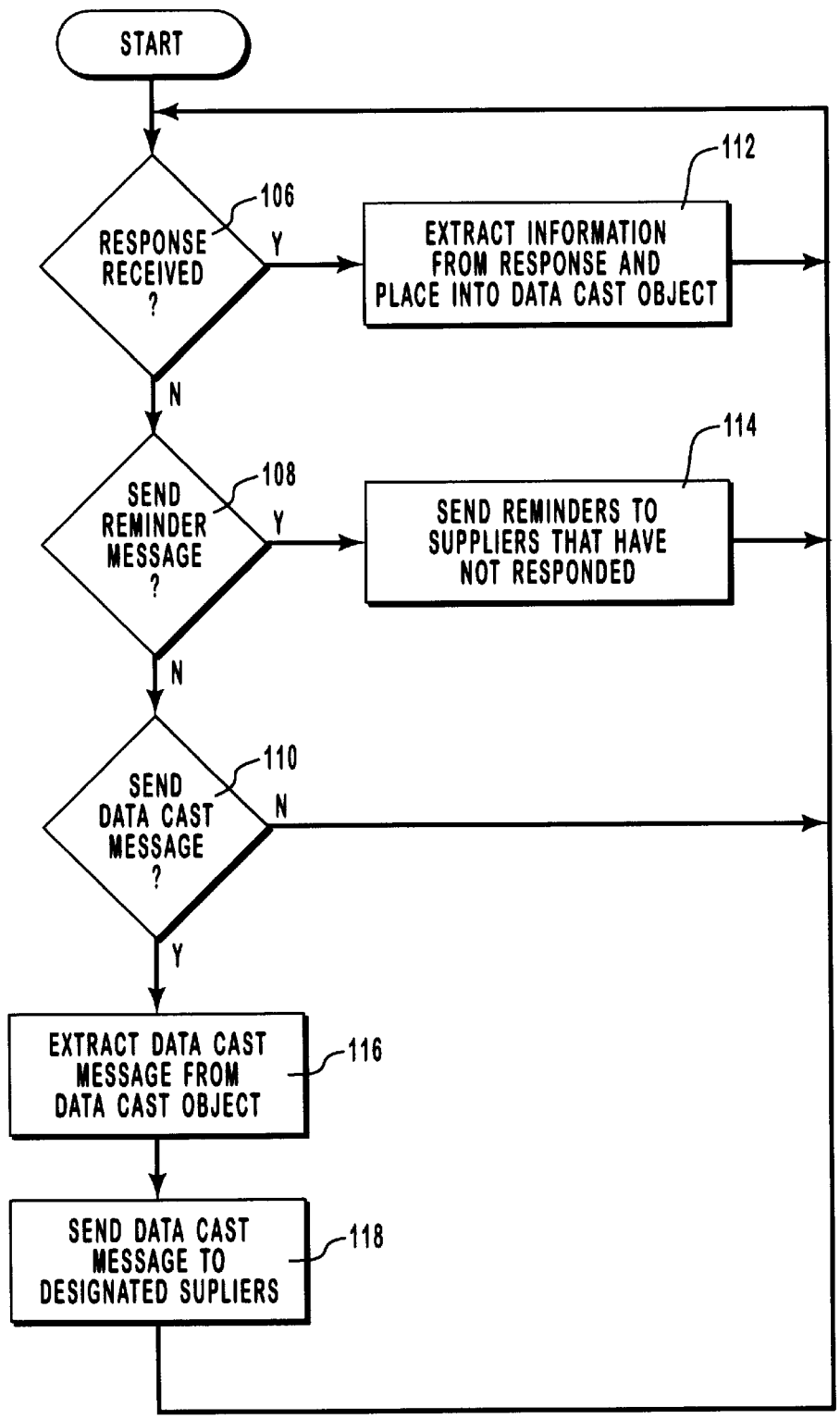
FIG. 6 is a flow diagram illustrating one implementation of the supplier communication processing block of FIG. 3A.

Referring now to FIG. 6, one implementation of supplier communication processing block 76 of FIG. 3A is presented. As explained above, supplier communication processing block 76 is responsible for all communications between the suppliers and the buyer. Although the embodiment illustrated in FIGS. 3A and 3B indicates that this function is performed by the buyer, in alternative embodiments, the data cast object may be passed to the service provider and the service provider would perform analogous functions.

In communicating with the suppliers, supplier communication processing block must be able to handle three specific events. The first event is that a response has been received from a particular supplier. The second event is that a reminder message should be sent to one or more suppliers. The final event is that a data cast message should be broadcast to a list of suppliers. In FIG. 6, these three events correspond to decision blocks 106, 108, and 110. Referring first to decision block 106, supplier communication processing block 76 tests whether a response has been received. If such a response has been received, then execution proceeds to step 112 where appropriate information is extracted from the response and placed into the corresponding receiver object in the data cast object. Any of the information previously described in conjunction with FIGS. 3A and 3B may be stored into the receiver object. The key point is that placing such information into the receiver objects allows data cast object 74 to become a contained unit of information that can be operated upon. After step 112, execution proceeds back to the start to await the next event.

Examining decision block 108, supplier communication processing block 76 tests whether a reminder message should be sent. As previously explained, when a data cast object is created a user may enter milestone or reminder dates that will trigger events in the system. For example, a reminder date will trigger a reminder message to be sent to those suppliers that have not responded by the reminder date. In certain embodiments it may be desirable to allow a plurality of reminder dates to be entered. In other embodiments, a single reminder date may be sufficient.

When a reminder is to be sent, execution proceeds to step 114 which creates the reminder message and sends a copy to the suppliers that have not yet responded. Such a reminder message may be a simple text message that reminds a supplier that they have not yet responded or may be more complex containing various information up to, and including, all information in original data cast message 68.

Referring next to decision block 110, supplier communication processing block 76 tests whether a data cast message should be sent. Strictly speaking, such a decision block may not be necessary if only three events are sent to supplier communication processing block 76. If supplier communication processing block 76 only receives notification of the three events identified in decision blocks 106, 108, and 110, then decision block 110 may be safely eliminated since by default if execution proceeds through decision block 106 and decision block 108 the only remaining event is that a data cast message should be sent If a data cast message should be sent, execution proceeds to step 116 where the data cast message is extracted from the data cast object. As previously described, a message and response tracking object, such as data cast object 74, may comprise the data cast message that is to be sent to the various suppliers. Step 116 extracts this message. Execution then proceeds to step 118 where the data cast message is broadcast to the designated suppliers. Execution then proceeds back to the start to await the occurrence of the next event.

Figure 7:
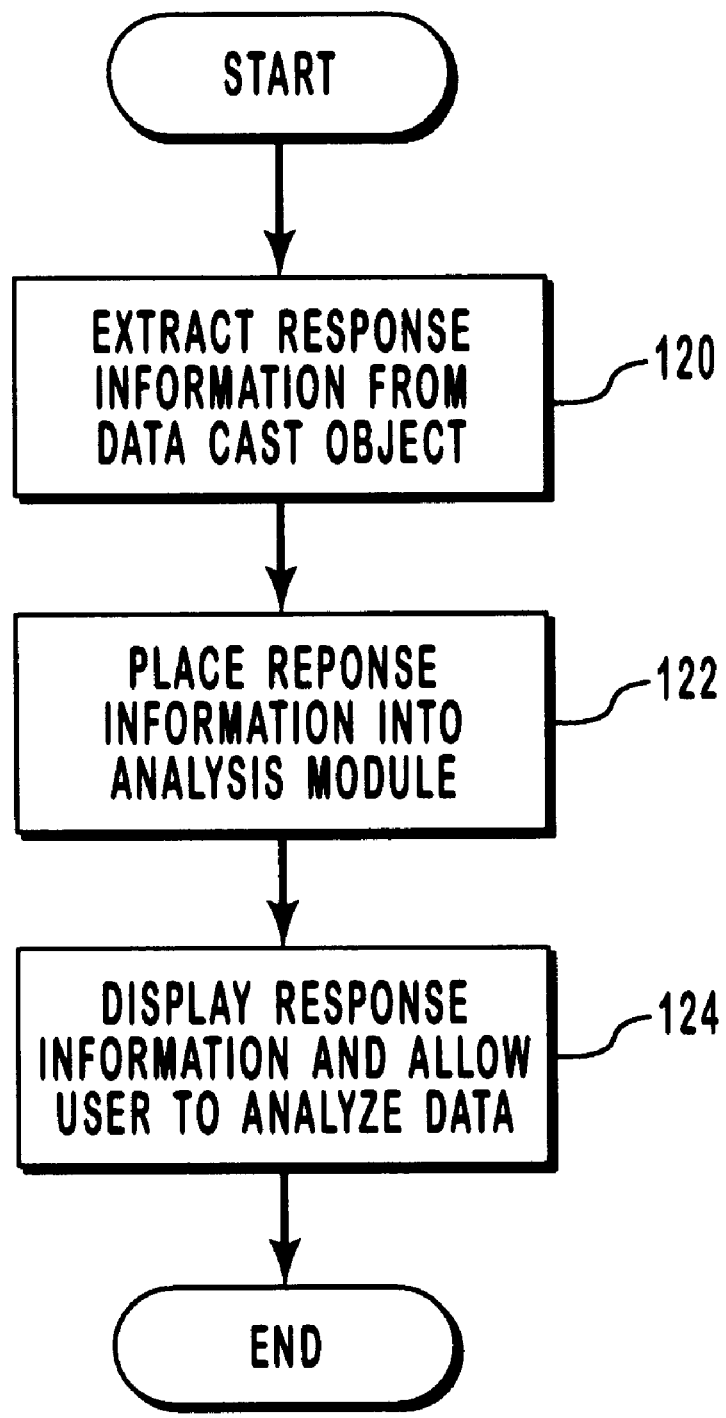
FIG. 7 is a flow diagram illustrating one implementation of the data cast analysis block of FIG. 3A.

Turning next to FIG. 7, one implementation of data cast analysis block 82 of FIG. 3A is presented. As previously explained, the present invention is ideally suited to using separate analysis modules to display or analyze the responses received from the various suppliers. This is because all information is collected into a central repository that can be passed from location to location and individual to individual. Thus, the data cast object may be passed to an analysis module for further analysis and display of the various information received from suppliers. In FIG. 7, step 120 indicates that the first step of the analysis module is to extract response information from the data cast object As previously explained in conjunction with the response object 72 used in data cast object 74, information may be stored that identifies what information should be extracted from the response and placed into an analysis module. For example, company information may be extracted and displayed as a header over a company's bid. In addition, the information returned in response to the various prompts sent in the data cast message may be extracted and displayed in a spreadsheet or other analysis module. Thus, step 120 extracts the appropriate information and formats it for use by the analysis module.

After the appropriate information has been extracted, step 122 transfers or places the response information into the analysis module. Such a process may require information to be transferred to the analysis module or that a handle or link to the information be passed to the analysis module so that the analysis module may be able to extract or reference the appropriate information.

Step 124 indicates that after the information has been placed into the analysis module, then the analysis module should display the response information and allow the user to analyze the data. The goal of this step is to allow a user to display or analyze information in appropriate ways in order to make sound purchasing decisions. If such analysis requires a plurality of analysis modules or a suite of analysis tools, then the process of the present invention can be adapted to accommodate such a suite. In one embodiment of the present invention, the information is transferred into a spreadsheet program, such as Microsoft® Excel. When Excel or another windows compliant spreadsheet program is utilized, the present invention may use the various functionality provided by the spreadsheet program to transfer information from data cast object 74 to the spreadsheet program. For example, Microsoft has defined a standard called OLE that allows information from one program to be linked and embedded into another program. Thus, information from data cast object 74 may be linked or embedded into a spreadsheet program using this technology. Other methods may exist on other computers to allow a similar process to be performed. If appropriate analysis tools do not exist, then such analysis tools may be created and made part of the present invention.

Although embodiments of the present invention have described the use of a single message and response tracking object, such as data cast object 74 of FIG. 3A, as a central repository for all information relating to a bid, other equivalent methods to the use of such an object are available. For example, a folder may be created where all information received is placed. This folder can then become the repository of information and can act like a single message and response tracking object. All that is required for the present invention is a single location or repository for all information regarding a particular data cast that can be transferred and that can serve as a magnet for communications received from the various suppliers.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by united states letters patent is:

1. A method for broadcasting a message from a sender to at least one receiver and for tracking responses from said at least one receiver to said sender, the method comprising the steps of:

creating a message and response tracking object comprising a broadcast message that is to be sent to at least one receiver and at least one response tracking object adapted for storing information received in response to said broadcast message;

sending said broadcast message to at least one receiver;

receiving from said at least one receiver at least one response to said broadcast message; and storing information from said at least one response into said at least one response tracking object such that said message and response tracking object forms an integrated data unit that contains both the broadcast message and information from responses to said broadcast message.

2. A method for broadcasting a message and for tracking responses as recited in claim 1 further comprising the step of consulting a database containing product information and selecting said at least one receiver from said database.

3. A method for broadcasting a message and for tracking responses as recited in claim 1 wherein said broadcast message comprises a sequence of prompts that are displayed to said at least one receiver when said broadcast message is received, said sequence of prompts comprising one prompt for each item of information that said sender wishes to receive from said at least one receiver.

4. A method for broadcasting a message and for tracking responses as recited in claim 1 further comprising the step of extracting response information from said message and response tracking object and transferring said extracted information to an analysis module where said extracted information can be compared and analyzed.

5. A method for broadcasting a message and for tracking responses as recited in claim 1 further comprising the step of sending a reminder to said at least one receiver if a response is not received from said at least one receiver by a predefined date.

6. A method for broadcasting a message and for tracking responses as recited in claim 1 further comprising the step of updating said broadcast message and sending said updated broadcast message to said at least one receiver so that said updated broadcast message supersedes and replaces said broadcast message.

7. A method of sending a bid request from a buyer to at least one supplier and for tracking responses received from said at least one supplier, said method comprising the steps of:

said buyer creating a message and response tracking object comprising a broadcast message containing a request for bid that is to be sent to at least one supplier and at least one response tracking object adapted for storing information received in response to said broadcast message;

said buyer sending said broadcast message to at least one supplier;

said buyer receiving from said at least one supplier at least one response to said broadcast message; and said buyer storing information from said at least one response into said at least one response tracking object such that said message and response tracking object forms an integrated data unit that contains both the broadcast message and information from responses to said broadcast message.

8. A method of sending a bid request and for tracking responses to said request as recited in claim 7 further comprising the step of consulting a database containing product information and selecting said at least one supplier from said database.

9. A method of sending a bid request and for tracking responses to said request as recited in claim 8 further comprising the step of extracting information from said message and response tracking object and transferring said extracted information to an analysis module where said extracted information can be compared and analyzed.

10. A method of sending a bid request and for tracking responses to said request as recited in claim 9 further comprising the step of sending a reminder to said at least one supplier if a response is not received from said at least one supplier by a predefined date.

11. A method of sending a bid request and for tracking responses to said request as recited in claim 10 wherein said broadcast message comprises a sequence of prompts entered by said buyer, said prompts being displayed to said at least one supplier when said broadcast message is received and examined by said at least one supplier, said prompts comprising one prompt for each item of information that said buyer wishes to receive in response to said bid request.

12. A method of sending a bid request and for tracking responses to said request as recited in claim 11 wherein said message and response tracking object comprises the date that a reminder should be sent to said at least one supplier if a response is not received from said at least one supplier.

13. A method of sending a bid request and for tracking responses to said request as recited in claim 12 wherein said message and response tracking object comprises the date that a response is due from said at least one supplier if said response is to be considered by said buyer.

14. A method of sending a bid request and for tracking responses to said request as recited in claim 13 wherein said broadcast message comprises attached documents in addition to any message text.

15. A method of sending a bid request from a buyer to at least one supplier and for tracking responses received from said at least one supplier, said method comprising the steps of:

said buyer browsing a database containing information from a plurality of suppliers indicating the products supplied;

said buyer selecting from said database a list of suppliers that said buyer wishes to request a bid from;

said buyer creating a message and response tracking object comprising a broadcast message containing bid request information that is to be sent to said list of suppliers and a response tracking object for each of the suppliers on said list of suppliers, said response tracking objects adapted for storing information received in response to said broadcast message;

sending said broadcast message to said list of suppliers;

receiving from the suppliers of said list of suppliers at least one response to said broadcast message; and storing information from said at least one response into the response tracking object corresponding to the supplier that sent said at least one response such that said message and response tracking object forms an integrated data unit that contains both the broadcast message and information from responses to said broadcast message.

16. A method of sending a bid request and for tracking responses to said request as recited in claim 15 further comprising the step of extracting information from each received response stored in said message and response tracking object and placing the extracted information into an analysis module so that the information extracted from each received response can be analyzed and compared.

17. A computer-readable medium having computer-executable instructions comprising:

means for creating a message and response tracking object comprising a broadcast message that is to be sent to at least one receiver and at least one response tracking object adapted for storing information received in response to said broadcast message;

means for sending said broadcast message to at least one receiver and for receiving from said at least one receiver at least one response to said broadcast message; and means for storing information from said at least one response into said at least one response tracking object such that said message and response tracking object forms an integrated data unit that contains both the broadcast message and information from responses to said broadcast message.

18. A computer-readable medium as recited in claim 17 wherein the executable instructions further comprise means for accessing a database comprising information about said at least one receiver and about products offered for sale by said at least one receiver.

19. A computer-readable medium as recited in claim 17 wherein the executable instructions further comprise means for analyzing information received in said at least one response and stored in said at least one response tracking object.

20. A computer-readable medium having a plurality of data fields stored on the medium and representing a data structure, comprising:

a first data field representing a broadcast message that is to be sent to at least one receiver, said first data field being stored in a range of addresses in said computer-readable medium;

one receiver object for each receiver that will receive said broadcast message, each of said receiver objects being stored in a separate range of addresses in said computer-readable medium, each of said receiver objects comprising:

a data field adapted for storing a text response received from one of said receivers that receive said broadcast object, said first data field being stored in a range of addresses used by one of said receiver objects.

21. A computer readable medium as recited in claim 20 further comprising a date field adapted for storing the date that said broadcast message was sent to said at least one receiver.

22. A computer readable medium as recited in claim 20 further comprising a date field adapted for storing the date that a reminder message should be sent to said at least one receiver.

23. A computer readable medium as recited in claim 20 further comprising a date field adapted for storing the data that a response is due from said at least one receiver.

24. A computer readable medium as recited in claim 20 further comprising a prompt field adapted for storing a plurality of data prompts that are displayed to said at least one receiver when said at least one receiver reads said broadcast message.

25. A computer readable medium as recited in claim 20 further comprising at least one field identifying information needed by an analysis module to extract information from said data field adapted for storing a text response received from one of said receivers so that the extracted information can be analyzed by a user using said analysis module.

* * * * *

UNITED STATES PATENT AND TRADEMARK OFFICE
CERTIFICATE OF CORRECTION

PATENT NO. : 6,014,644
DATED : Jan. 11, 2000
INVENTOR(S) : Ranel E. Erickson

It is certified that error appears in the above-identified patent and that said Letters Patent are hereby corrected as shown below:

Cover Page, Abstract, line 2, after "buyers" insert --and--

Col. 1, line 26, after "as the" change "culnination" to --culmination--

Col. 3, line 62, after "document" insert a period

Col. 4, line 7, after "object" insert a period

Col. 5, line 8, after "and" change "SO" to --so--

Col. 5, line 29, after "into" change "an" to --a--

Col. 6, line 14, after "are" delete "a"

Col. 6, line 63, change "comprises" to --comprise--

Col. 7, line 45, after "present" insert --invention--

Col. 8, line 65, after "that" change "allow" to --allows--

Col. 10, line 29, after "implementations" and "specific" insert a comma

Col. 13, line 17, after "object" insert a period

Col. 13, line 49, after "met" insert a period

Col. 19, line 8, after "may be" change "use" to --used--

UNITED STATES PATENT AND TRADEMARK OFFICE
CERTIFICATE OF CORRECTION

PATENT NO. : 6,014,644
DATED : Jan. 11, 2000
INVENTOR(S) : Ranel E. Erickson

It is certified that error appears in the above-identified patent and that said Letters Patent are hereby corrected as shown below:

Col. 20, line 44, after "object" insert a period

Signed and Sealed this

Third Day of April, 2001

Attest:

NICHOLAS P. GODICI

Attesting Officer    Acting Director of the United States Patent and Trademark Office